(12) United States Patent
Higuchi et al.

(10) Patent No.: US 8,549,244 B2
(45) Date of Patent: Oct. 1, 2013

(54) DEVICE AND METHOD OF COPYING DATA BETWEEN DISKS HAVING EQUAL OR DIFFERENT ROTATIONAL RATES

(75) Inventors: Kenji Higuchi, Kawasaki (JP); Eiichi Yamanaka, Sagamihara (JP); Reisuke Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 110 days.

(21) Appl. No.: 13/181,909

(22) Filed: Jul. 13, 2011

(65) Prior Publication Data
US 2012/0017057 A1    Jan. 19, 2012

(30) Foreign Application Priority Data
Jul. 16, 2010    (JP) .................................. 2010-161158

(51) Int. Cl.
*G06F 12/06* (2006.01)
*G06F 12/16* (2006.01)

(52) U.S. Cl.
USPC .................................. 711/162; 711/E12.103

(58) Field of Classification Search
USPC .......................................... 711/162, E12.103
See application file for complete search history.

(56) References Cited

U.S. PATENT DOCUMENTS

| | | | |
|---|---|---|---|
| 6,748,487 B1 | 6/2004 | Takamoto et al. | |
| 6,901,479 B2 | 5/2005 | Tomita | |
| 7,581,061 B2 * | 8/2009 | Miyagaki et al. | 711/114 |
| 2006/0236056 A1 * | 10/2006 | Nagata | 711/165 |
| 2007/0088929 A1 * | 4/2007 | Hanai et al. | 711/165 |
| 2007/0255914 A1 * | 11/2007 | Maki et al. | 711/162 |
| 2008/0126730 A1 * | 5/2008 | Miyamae et al. | 711/165 |
| 2009/0031167 A1 * | 1/2009 | Onabe et al. | 714/6 |
| 2009/0198942 A1 * | 8/2009 | Morishita et al. | 711/170 |
| 2009/0276569 A1 * | 11/2009 | Yamamoto et al. | 711/114 |

FOREIGN PATENT DOCUMENTS

| | | |
|---|---|---|
| JP | 63-280356 A | 11/1988 |
| JP | 1-140326 A | 6/1989 |
| JP | 4-092941 A | 3/1992 |
| JP | 2003-223284 A | 8/2003 |
| JP | 2004-21370 A | 1/2004 |
| WO | WO-99/40516 | 8/1999 |

\* cited by examiner

*Primary Examiner* — Hal Schnee
(74) *Attorney, Agent, or Firm* — Fujitsu Patent Center

(57) ABSTRACT

A data copying device that copies data stored in a first data storage device to a second data storage device is disclosed. The data copying device includes a data reading unit that reads data that has an amount determined based on a number of a plurality of logical volumes included in the first data storage device storing the data to be copied and an amount of data to be transferred from each of the logical volumes, a storage unit that stores the data read by the data reading unit, and a data transfer unit that transfers the data stored in the storage unit to the second storage device.

6 Claims, 9 Drawing Sheets

DEVICE AND METHOD OF COPYING DATA BETWEEN DISKS HAVING EQUAL OR DIFFERENT ROTATIONAL RATES

CROSS-REFERENCE TO RELATED APPLICATIONS

This application is based upon and claims the benefit of priority of the prior Japanese Patent Application No. 2010-161158, filed on Jul. 16, 2010, the entire contents of which are incorporated herein by reference.

FIELD

Embodiments discussed herein relate to a data copying device, a method for copying data and a data storage device.

BACKGROUND

In general, a storage region is duplicated in different storage devices so that data is managed for the purpose of preventing the data from being lost when one of the storage devices fails or for another purpose.

In recent years, the capacity of a memory device that is included in a storage device has increased. With the increase in the capacity, a time period for copying data has increased. Thus, a rotational rate of a disk of the memory device has increased.

However, due to the increase in the rotational rate of the disk of the memory device, it may be difficult to synchronize the timing of a data copy operation in the storage device, and, as a result, the number of failures to copy data may increase. When a failure to copy data occurs in the storage device, the storage device re-performs an operation of acquiring, from the memory device, the data that has not been successfully copied. When the storage device performs this operation, a time (seek time) for causing a reading device (head) included in the memory device to move above a disk occurs. Thus, there is a problem that a time period that is necessary to copy data increases.

SUMMARY

According to an aspect of the embodiment, a data copying device that copies data stored in a first data storage device to a second data storage device includes, a data reading unit that reads data that has an amount determined on the basis of the number of a plurality of logical volumes included in the first data storage device storing the data to be copied and the amount of data to be transferred from each of the logical volumes before transfer of the data, a storage unit that stores the data that has the determined amount and has been read from the first data storage device, and a data transfer unit that transfers, in parallel, the data read from the logical volumes and stored in the storage unit to the second storage device in which the data to be copied is stored.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF THE EMBODIMENTS

Embodiments are described below in detail with reference to the accompanying drawings.

First, a data copying device according to the embodiments is described. Then, the embodiments are described in detail.

First Embodiment

Figure 1:
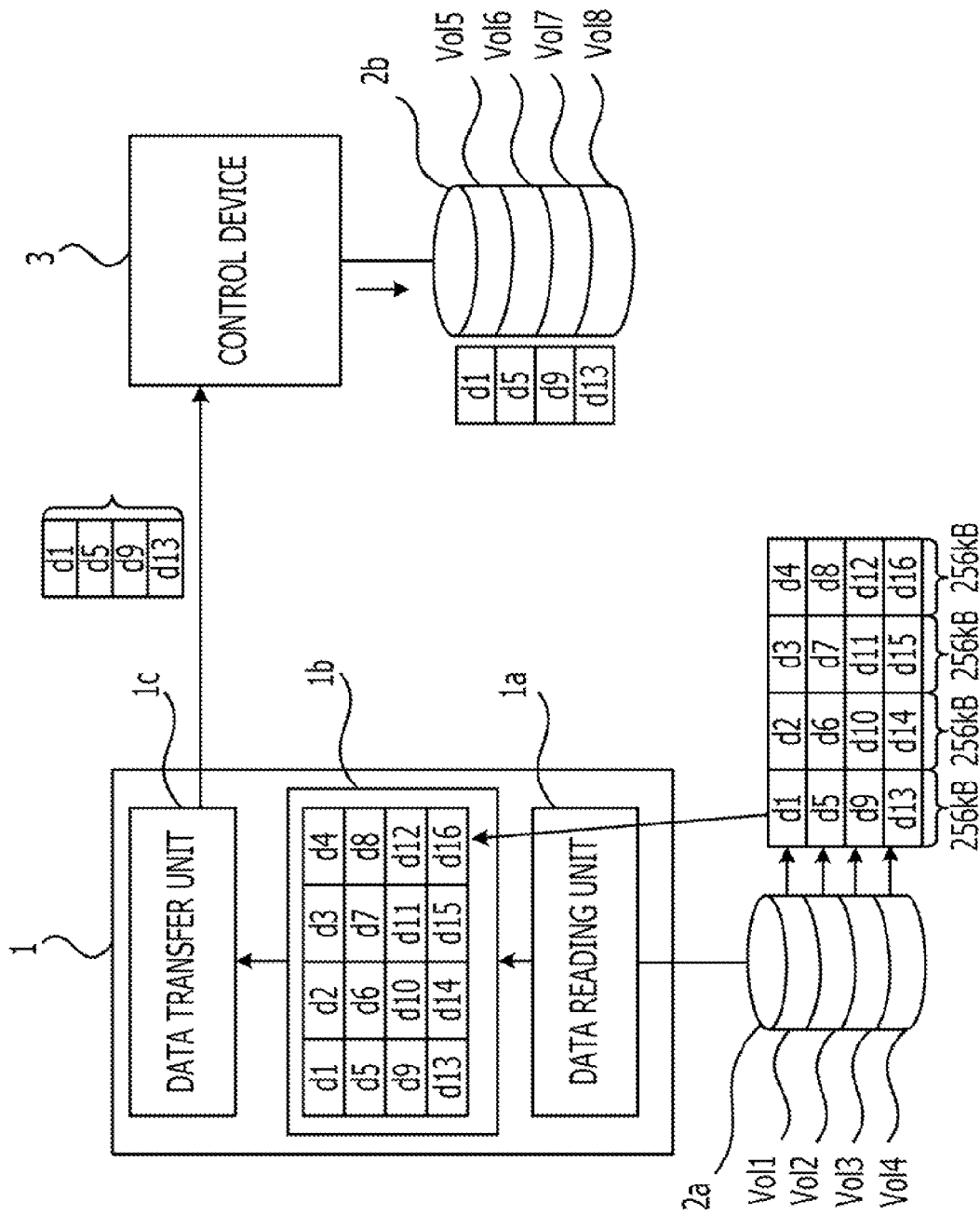
FIG. 1 is an outline diagram illustrating a data copying device according to a first embodiment.

FIG. 1 is an outline diagram illustrating the data copying device according to a first embodiment.

The data copying device 1 according to the first embodiment is a device that copies data from a first data memory device 2a to a second data memory device 2b. The data copying device 1 includes a data reading unit 1a, a storage unit 1b and a data transfer unit 1c.

Before transfer of data, the data reading unit 1a reads data that has an amount determined on the basis of the relationship between the number of logical volumes Vol1, Vol2, Vol3 and Vol4 included in the first data storage device 2a storing data to be copied and a data amount pre-specified for each of the logical volumes and for a transfer operation (copy operation) that is performed by the data transfer unit 1c.

Examples of the first data memory device 2a are a hard disk drive (HDD) and a solid state disk (SSD).

The amount of data read at one time is determined on the basis of the data amount pre-specified for each of the logical volumes Vol1, Vol2, Vol3 and Vol4 included in the first data memory device 2a and the number of the logical volumes included in the first data memory device 2a.

The data amount pre-specified for each of the logical volumes can be determined on the basis of the capacity of the storage unit 1b, an actually measured value designed to prevent data from being erroneously read from the storage unit 1b by the data transfer unit 1c, and the like. For example, the data amount pre-specified for each of the logical volumes may be set to a data amount of 1 MB that is equal to the total amount of four data pieces of 256 kB.

In FIG. 1, the number of the logical volumes is 4. Thus, the amount of data that is read from the first data memory device 2a by the data reading unit 1a at one time may be set to a data amount of 4 MB=1 MB×4.

The data reading unit 1a reads uncopied 4-MB data from the first data memory device 2a. For example, as illustrated in FIG. 1, the data reading unit 1a reads 256-kB data d1, d2, d3 and d4 (the total of the amounts of the data d1, d2, d3 and d4 is 1 MB) from the volume Vol1. The data reading unit 1a reads 256-kB data d5, d6, d7 and d8 (the total of the amounts of the data d5, d6, d7 and d8 is 1 MB) from the volume Vol2. The data reading unit 1a reads 256-kB data d9, d10, d11 and d12 (the total of the amounts of the data d9, d10, d11 and d12 is 1 MB) from the volume Vol3. The data reading unit 1a reads 256-kB data d13, d14, d15 and d16 (the total of the amounts of the data d13, d14, d15 and d16 is 1 MB) from the volume Vol4. The read data is stored in the storage unit 1b.

The storage unit 1b stores the data read from the first data memory device 2a by the data reading unit 1a. The storage unit 1b is a random access memory (RAM) or the like.

The data transfer unit 1c transfers, in parallel, the data read from the logical volumes Vol1, Vol2, Vol3 and Vol4 and stored in the storage unit 1b to a control device 3 that controls the second data memory device 2b in which the data is to be stored. Transferring the data in parallel means that: the following first data that is read from the logical volumes Vol1, Vol2, Vol3 and Vol4 is simultaneously transferred; the following second data that is read from the logical volumes Vol1, Vol2, Vol3 and Vol4 is simultaneously transferred; the following third data that is read from the logical volumes Vol1, Vol2, Vol3 and Vol4 is simultaneously transferred; and the following fourth data that is read from the logical volumes Vol1, Vol2, Vol3 and Vol4 is simultaneously transferred. In FIG. 1, the first data d1, d5, d9 and d13 is simultaneously transferred to the control device 3. Next, the second data d2, d6 d10, d14 is simultaneously transferred to the control device 3. Then, the third data d3, d7, d11 and d15 is simultaneously transferred to the control device 3. Then, the fourth data d4, d8, d12 and d16 is simultaneously transferred to the control device 3.

Since the data is read from the storage unit 1b, the data may be read at a higher rate than the rate at which the data is directly read from the first data memory device 2a. In addition, since the data is read in parallel, the efficiency of transferring the data to the control device 3 from the data transfer unit 1c is improved, and it is possible to increase the possibility that the rate at which the data is read from the storage unit 1b by the data reading unit 1a can be supported.

The second data memory device 2b has the same volume configuration as the first data memory device 2a. The control device 3 causes the data d1 to be stored in a logical volume Vol5. The control device 3 causes the data d5 to be stored in a logical volume Vol6. The control device 3 causes the data d9 to be stored in a logical volume Vol7. The control device 3 causes the data d13 to be stored in a logical volume Vol8.

In addition, during the time when the data transfer unit 1c reads the data from the storage unit 1b and transfers the data to the control device 3, the data reading unit 1a reads data (to be next copied) that has an amount of 4 MB from the first data memory device 2a using the aforementioned method before the data transfer unit 1c performs the next transfer operation. The read data can be stored in the storage unit 1b.

In the data copying device 1 according to the first embodiment, the amount of data that is read from the first data memory device 2a by the data reading unit 1a at one time is determined on the basis of the pre-specified amount of data read from each of the logical volumes Vol1, Vol2, Vol3 and Vol4 included in the first data memory device 2a and the number of the logical volumes Vol1, Vol2, Vol3 and Vol4 included in the first data memory device 2a. The storage unit 1b stores the data that has the determined amount. The data transfer unit 1c transfers, in parallel, the data read from the logical volumes Vol1, Vol2, Vol3 and Vol4 and stored in the storage unit 1b to the control device 3 that controls the second data memory device 2b. The aforementioned process can improve the efficiency of transferring the data to the control device 3 from the data transfer unit 1c and increase the possibility that the rate at which the data is read from the storage unit 1b by the data reading unit 1a can be supported. Thus, it is possible to reduce the need for the data reading unit 1a to read the data from the first data memory device 2a again. The reason is as follows. If the operation of transferring data to the control device 3 by the data transfer unit 1c does not support the rate at which the data is read from the storage unit 1b by the data reading unit 1a, data that is stored in the storage unit 1b may be updated by the preceding reading process performed by the data reading unit 1a, and data to be read by the data transfer unit 1c may not exist in the storage unit 1b. If the data to be read by the data transfer unit 1c does not exist in the storage unit 1b, the data reading unit 1a searches the data (that was not able to be read) in the first data memory device 2a again. The time period for which the data reading unit 1a searches the data and reads the data into the storage unit 1b would be lost time. However, the aforementioned process that is performed by the data copying device 1 can suppress the occurrence of the loss of time.

Whether or not the data copying device 1 performs the aforementioned process so as to copy the data from the first data memory device 2a to the second data memory device 2b may be determined on the basis of a rotational rate (per unit time) of a disk included in the first data memory device 2a, for example. The rotational rate that is used to determine whether or not the data is copied by the aforementioned process may be 15000 rpm or more.

In addition, whether or not the data copying device 1 performs the aforementioned process so as to copy the data from the first data memory device 2a to the second data memory device 2b can be determined on the basis of the relationship between the rotational rate of the disk included in the first data memory device 2a and a rotational rate (per unit time) of a disk included in the second data memory device 2b.

For example, the data reading unit 1a can determine whether or not the rotational rate of the disk included in the second data memory device 2b is equal to the rotational rate of the disk included in the first data memory device 2a. When the rotational rate of the disk included in the second data memory device 2b is equal to the rotational rate of the disk included in the first data memory device 2a, the data copying device 1 can perform the aforementioned process and copy the data to the second data memory device 2b.

On the other hand, when the rotational rate of the disk included in the second data memory device 2b is lower than the rotational rate of the disk included in the first data memory device 2a, the data reading unit 1a may treat the logical volumes Vol1, Vol2, Vol3 and Vol4 included in the first data memory device 2a as one group and read the data from the first data memory device 2a at one time on a 1-MB basis (as described above) in order from the first address of the logical volume Vol1 to the last address of the logical volume Vol4. Since data of 1 MB is read from the first data memory device 2a at one time and stored in the storage unit 1b, the data may be copied at a higher rate, compared to the case in which the data is stored in the storage unit 1b on a 256-kB basis.

The data reading unit 1a and the data transfer unit 1c may be achieved by functions that are included in a central processing unit (CPU) that is included in the data copying device 1.

Next, the embodiment is described in more detail.

Second Embodiment

Figure 2:
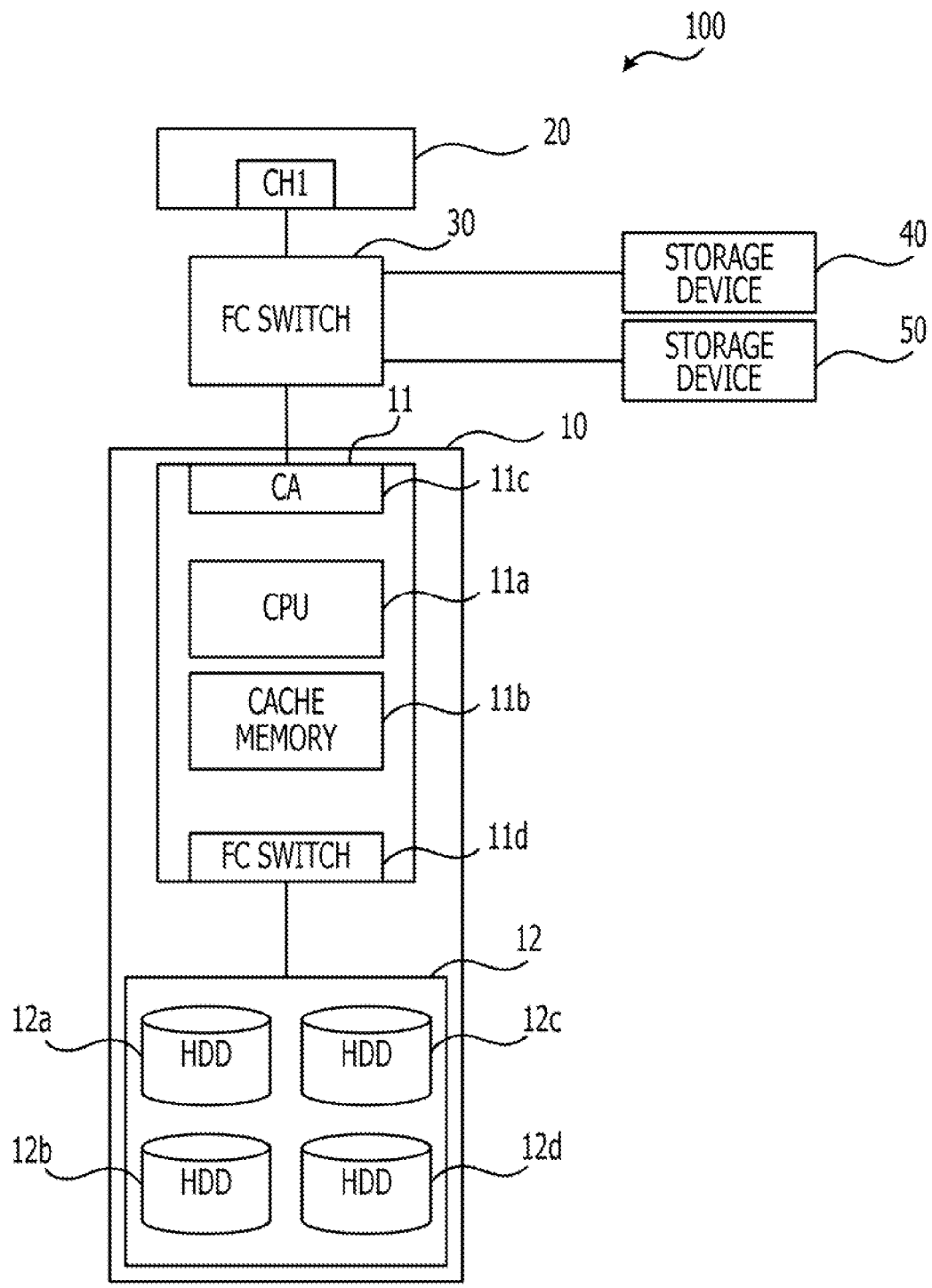
FIG. 2 is block diagram illustrating a storage system according to a second embodiment.

FIG. 2 is a block diagram illustrating a storage system according to a second embodiment.

A storage system 100 includes a storage device 10, a host computer 20, a fibre channel (FC) switch 30, a storage device 40 and a storage device 50.

The storage device 10 includes a controller module (CM) 11 and a drive enclosure (DE) 12.

In the storage system 100, the drive enclosure 12 is connected to the host computer 20 through the controller module 11.

The controller module 11 is controlled by a CPU 11a. The CPU 11a is connected to a cache memory 11b, a channel adapter (CA) 11c and a fibre channel switch 11d through an internal bus (not illustrated).

At least a part of a program that is executed by the CPU 11a is temporarily stored in the cache memory 11b. In addition, various types of data that is necessary for a process to be performed by the CPU 11a are stored in the cache memory 11b. Furthermore, data that is read from the drive enclosure 12 is stored in the cache memory 11b.

The channel adapter 11c is connected to the fibre channel switch 30. The channel adapter 11c is connected to a channel (CH) 1 of the host computer 20 through the fibre channel switch 30. Data is transferred between the host computer 20 and the CPU 11a through a path connecting the channel adapter 11c to the channel 1 of the host computer 20.

The fiber channel switch 11d is connected to the drive enclosure 12. The CPU 11a transmits and receives data to and from the drive enclosure 12 (located outside the controller module 11) through the fibre channel switch 11d.

The controller module 11 transmits an I/O command to the drive enclosure 12 as access instruction information and instructs the drive enclosure 12 to perform an operation of inputting and outputting data to and from a storage region of the storage device 10. In addition, when a time for monitoring access elapses after the input/output instruction operation and the controller module 11 does not receive a response, the controller module 11 transmits an abort instruction command to the drive enclosure 12 so as to instruct the drive enclosure 12 to stop the input/output operation.

The drive enclosure 12 has a plurality of hard disk drives that forms a redundant array of inexpensive disks (RAID) designed for redundancy. In the present embodiment, the drive enclosure 12 has hard disk drives 12a, 12b, 12c and 12d provided with disks that rotate at a rotational rate (per unit time) of 15000 rpm.

The drives that are included in the drive enclosure 12 are not limited to the hard disk drives. For example, the drives may be replaced with SSDs, magneto-optical discs or the like.

The storage device 40 and the storage device 50 include hard disk drives. The data that is stored in the drive enclosure 12 is copied to the hard disk drives included in the storage devices 40 and 50.

The storage device 40 and the storage device 50 have hardware configurations that are the same as or similar to the storage device 10. However, a rotational rate (per unit time) of the hard disk drives included in the storage device 40 is different from a rotational rate (per unit time) of the hard disk drives included in the storage device 50.

Specifically, a drive enclosure that is included in the storage device 40 has the hard disk drives provided with disks that rotate at a rotational rate (per unit time) of 15000 rpm. In other words, the drive enclosure that is included in the storage device 40 has the hard disk drives provided with the disks that rotate at the rotational rate that is equal to the rotational rate of the disks of the hard disk drives included in the drive enclosure 12.

On the other hand, a drive enclosure that is included in the storage device 50 has the hard disk drives provided with disks that rotate at a rotational rate (per unit time) of 7200 rpm. In other words, the drive enclosure that is included in the storage device 50 has the hard disk drives provided with the disks that rotate at a rotational rate (per unit time) that is lower than the rotational rate of the disks of the hard disk drives included in the drive enclosure 12.

FIG. 2 illustrates the case in which the one host computer 20 is connected to the controller module 11. However, a plurality of host computers may be connected to the controller module 11.

With the aforementioned hardware configuration, processing functions of the controller module 11 can be achieved.

Next, the functions of the controller module 11 are described.

Figure 3:
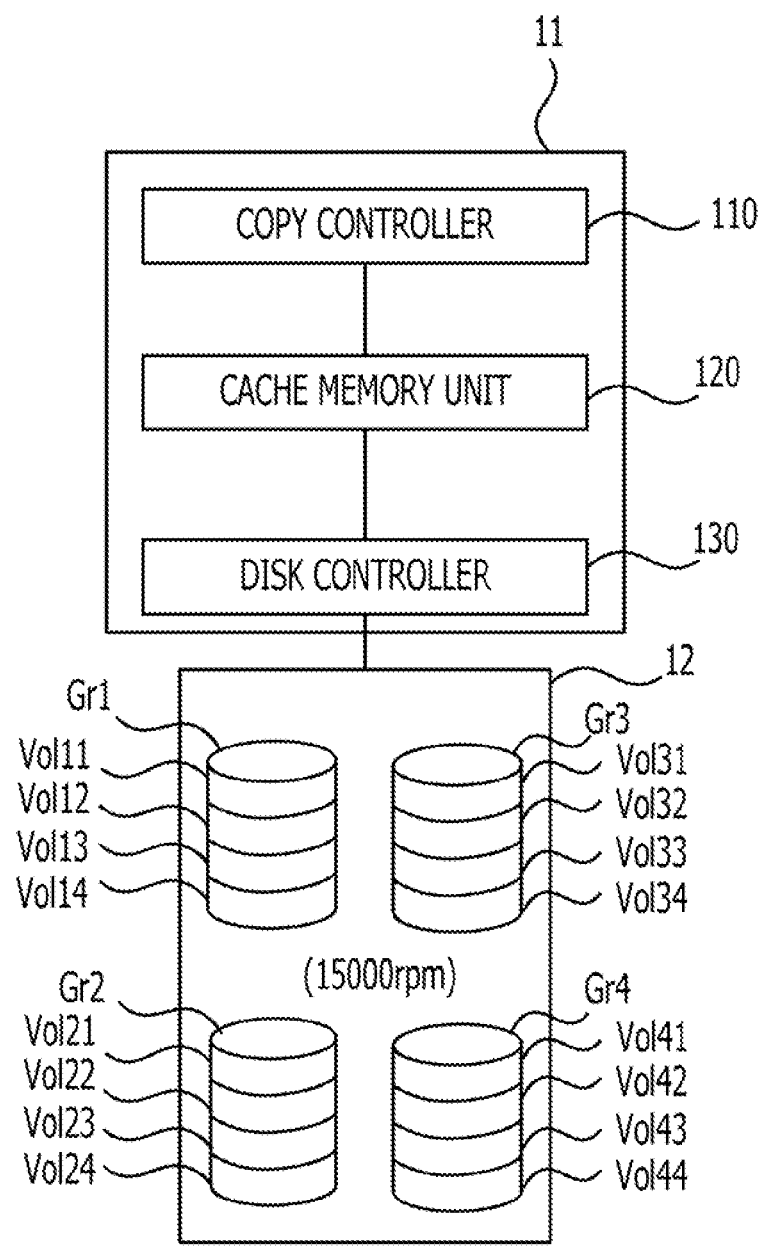
FIG. 3 is a block diagram illustrating functions of a controller module.

FIG. 3 is a block diagram illustrating the functions of the controller module 11.

The controller module 11 includes a copy controller 110, a cache memory unit 120 and a disk controller 130.

The copy controller 110 determines, on the basis of an instruction of the host computer 20, a storage region of a hard disk drive included in the storage device 40 or 50 so that data that is stored in the hard disk drives 12a, 12b, 12c and 12d is copied to the determined storage region. The copy controller 110 controls a logical copy operation and a physical copy operation.

The copy controller 110 instructs the disk controller 130 to read data that has been stored in the hard disk drives 12a, 12b, 12c and 12d and has an amount varying depending on the rotational rate of a disk to which the data stored in the hard disk drives 12a, 12b, 12c and 12d is copied.

The hard disk drives 12a to 12d that are included in the drive enclosure 12 form four RAID groups Gr1 to Gr4. The RAID groups Gr1 to Gr4 each include four logical volumes. Specifically, the RAID group Gr1 includes logical volumes Vol11, Vol12, Vol13 and Vol14. The RAID group Gr2 includes logical volumes Vol21, Vol22, Vol23 and Vol24. The RAID group Gr3 includes logical volumes Vol31, Vol32, Vol33 and Vol34. The RAID group Gr4 includes logical volumes Vol41, Vol42, Vol43 and Vol44.

The cache memory unit 120 temporarily stores data received from the host computer 20 and data received from the cache memory 11b.

The cache memory unit 120 performs control using a least recently used (LRU) algorithm or the like so as to cause data that is frequently accessed to remain on a priority basis.

The disk controller 130 performs load balance control so as to control the drive enclosure 12 provided with the RAID configuration.

The disk controller 130 accesses the RAID groups Gr1 to Gr4 on the basis of an instruction of the copy controller 110, prefetches data from the RAID groups Gr1 to Gr4 through the access, and causes the prefetched data to be stored in the cache memory unit 120.

The disk controller 130 prefetches the data from the RAID groups Gr1 to Gr4 and causes the prefetched data to be stored in the cache memory unit 120 in units that are called sessions. The number of the sessions is equal to the number of the logical volumes. In the present embodiment, the disk controller 130 prefetches data from each of the RAID groups on a four-session (multi-session) basis and causes the prefetched data to be stored in the cache memory unit 120.

Next, an operation (hereinafter referred to as a first copy operation) of the controller module 11 to copy data stored in the drive enclosure 12 to the storage device 40 is described.

The first copy operation can be performed to copy data to a hard disk drive provided with a disk that rotates at a rotational rate (per unit time) that is equal to the rotational rate (per unit time) of the disks of the hard disk drives included in the drive enclosure 12. The rotational rate of the disk of the hard disk drive that is used for the first copy operation is 15000 rpm or more, for example.

Figure 4:
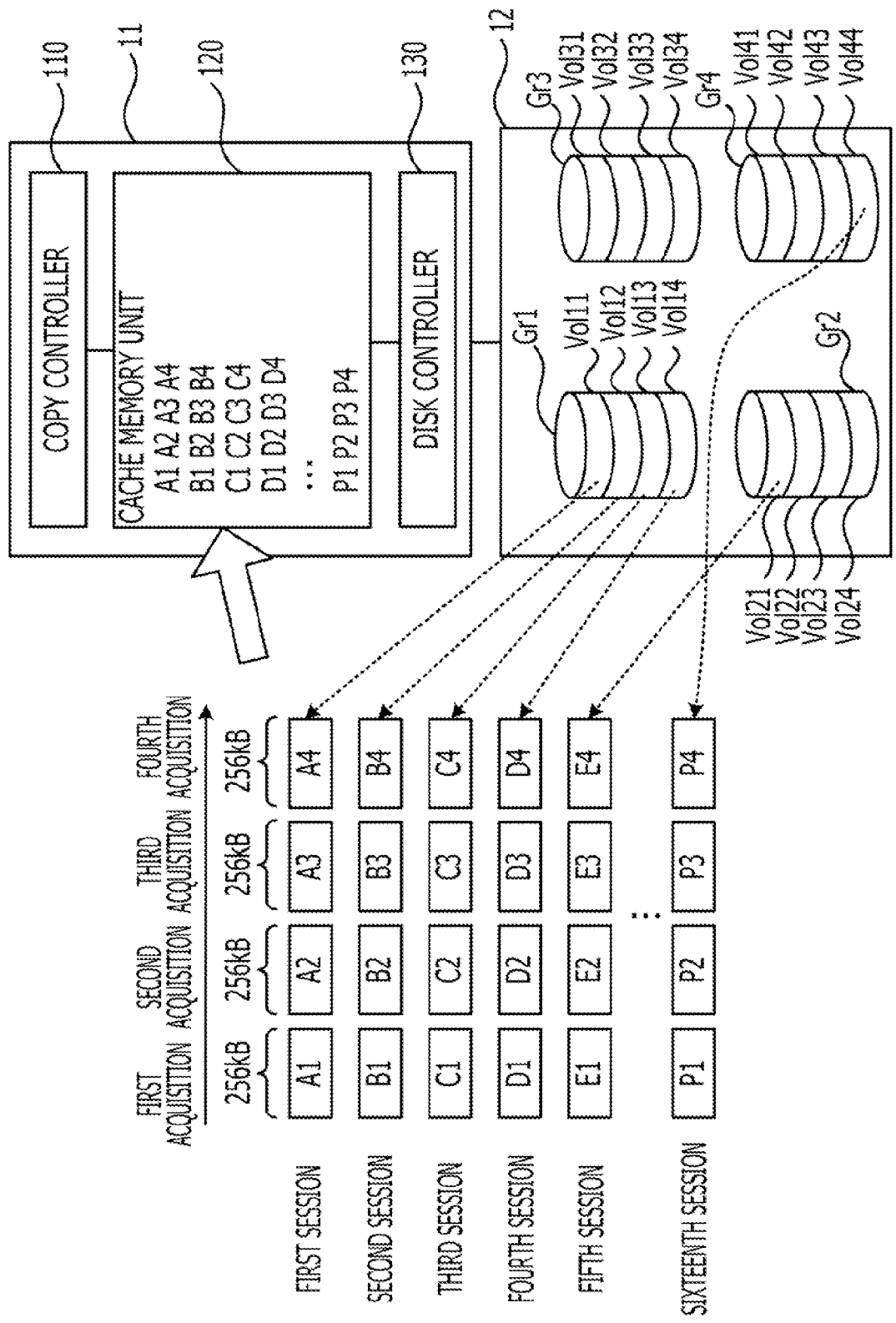
FIG. 4 is a diagram illustrating a first copy operation of the controller module.

FIG. 4 is a diagram illustrating the first copy operation of the controller module 11.

In the first copy operation, the disk controller 130 prefetches data that has an amount expressed by the following Equation (1) from the volumes Vol11, Vol12, Vol13, Vol14, Vol21, Vol22, Vol23, Vol24, Vol31, Vol32, Vol33, Vol34, Vol41, Vol42, Vol43 and Vol44 that form the RAID groups Gr1 to Gr4, and the disk controller 130 causes the prefetched data to be stored in the cache memory unit 120.

The total amount of data to be prefetched=the amount of data to be prefetched in one session×the number of sessions    Equation (1)

The amount of data to be prefetched in one session is a fixed value. For example, the amount of data to be prefetched in one session can be determined on the basis of the capacity of the cache memory unit 120, an actually measured value designed to prevent data from being erroneously read from the cache memory unit 120 by the copy controller 110, and the like. In the present embodiment, the amount of data to be prefetched in one session is equal to the total amount of four 256-kB data pieces to be read. In addition, since the number of the sessions is equal to the number of the logical volumes as described above, the number of the sessions is 16=4 RAID groups×4 logical volumes. Thus, in the present embodiment, the total amount of data to be fetched is 16 MB=256 kB×4×16.

A method for acquiring the data is described. In the first session, data A1, A2, A3 and A4 that is obtained by dividing data stored in continuous regions of the logical volume Vol11 of the RAID group Gr1 into four 256-kB data blocks is continuously acquired. After that, data is acquired in the second session. In the second to fourth sessions, data is acquired in the same manner as the method for acquiring the data in the first session.

In the fifth session, data E1, E2, E3 and E4 that is obtained by dividing data stored in continuous regions of the logical volume Vol21 of the RAID group Gr2 into four 256-kB data blocks is continuously acquired. In the sixth to eighth sessions, data is acquired in the same manner as the method for acquiring the data in the fifth session.

Data is acquired from the RAID groups Gr3 and Gr4 in the same manner as the method for acquiring the data from the RAID groups Gr1 and Gr2.

As a result of the data acquisition, the 1 MB data is stored in the cache memory unit 120 in each of the 16 sessions (or the data with the total amount of 16 MB is stored in the cache memory unit 120).

Figure 5:
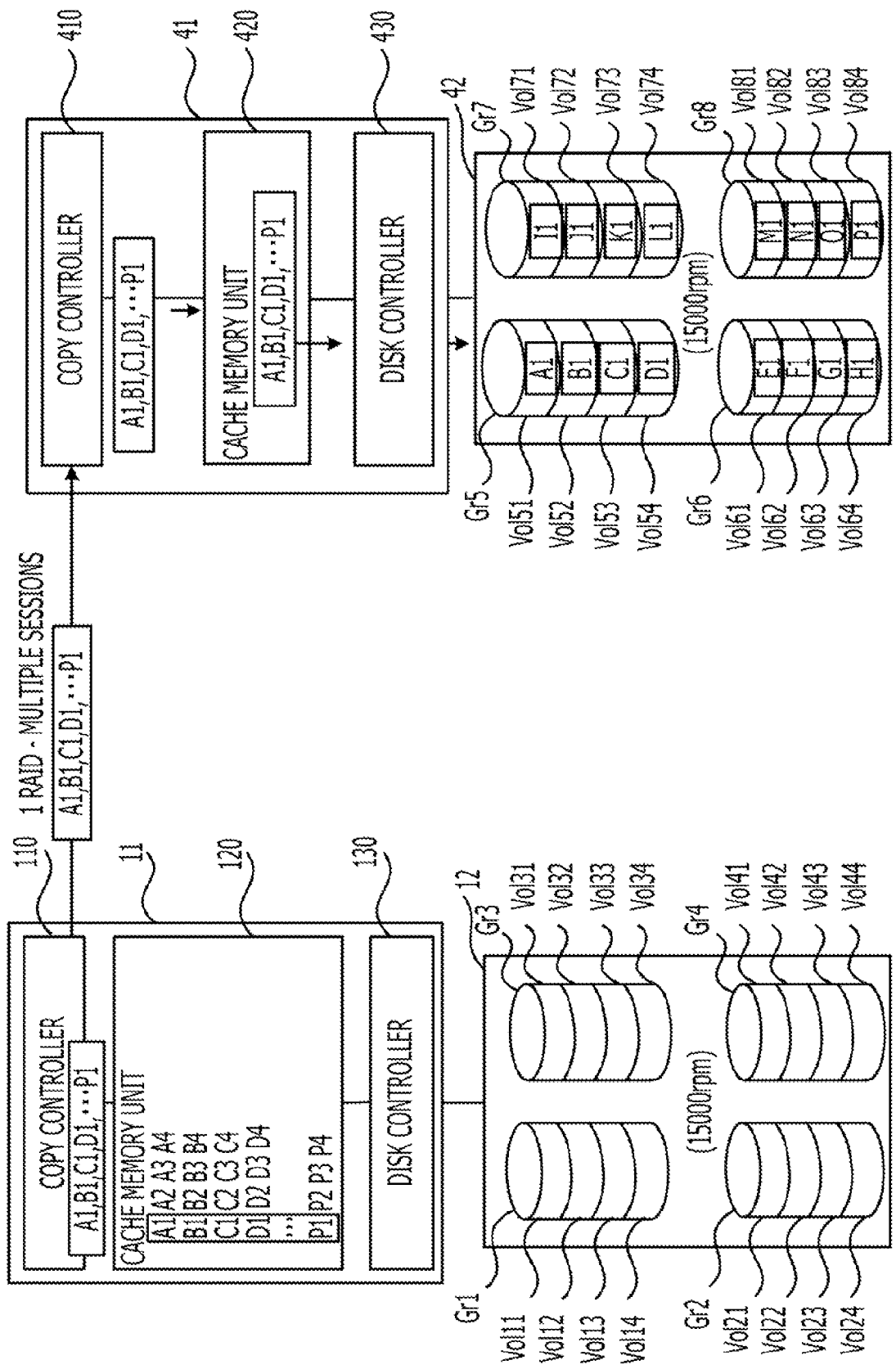
FIG. 5 is a diagram illustrating the first copy operation.

FIG. 5 is a diagram illustrating the first copy operation.

The storage device 40 includes a controller module 41 and a drive enclosure 42. The controller module 41 has the same functions as the controller module 11. The drive enclosure 42 has the same RAID configuration as the drive enclosure 12.

The copy controller 110 acquires the data A1, B1, C1, D1, . . . , P1 for the 16 sessions from the cache memory unit 120. Specifically, the copy controller 110 acquires the 256-kB data from each of the volumes of the RAID groups Gr1 to Gr4. Then, the copy controller 110 transmits the acquired data A1, B1, C1, D1, . . . , P1 to the storage device 40 to which the data is to be copied.

In the storage device 40 that receives the data A1, B1, C1, D1, . . . , P1, a copy controller 410 causes the received data A1, B1, C1, D1, . . . , P1 to be stored in a cache memory unit 420.

A disk controller 430 reads the data A1, B1, C1, D1, . . . , P1 stored in the cache memory unit 420 and writes the read data A1, B1, C1, D1, . . . , P1 in volumes Vol51, Vol52, Vol53, Vol54, Vol61, Vol62, Vol63, Vol64, Vol71, Vol72, Vol73, Vol74, Vol81, Vol82, Vol83, Vol84 of RAID groups Gr5 to Gr8.

A process that is the same as the process performed on the data A1, B1, C1, D1, . . . , P1 is performed on data A2, B2, C2, D2, . . . P2, data A3, B3, C3, D3, . . . , P3, and data A4, B4, C4, D4, . . . , P4.

During the time when the copy controller 110 transmits the data to the copy controller 410, the disk controller 130 prefetches data to be next copied and causes the prefetched data (to be next copied) to be stored in the cache memory unit 120 in the same manner as the method illustrated in FIG. 4. For example, when data A5 is adjacent to the data A4 stored in the volume Vol11, the disk controller 130 continuously acquires the data A5 and data A6, A7 and A8. After that, the disk controller 130 acquires data in the second session. In the second to fourth sessions, the disk controller 130 acquires data in the same manner as the method for acquiring the data in the first session.

In the fifth session, data E5, E6, E7 and E8 that is obtained by dividing data stored in continuous regions of the logical volume Vol21 of the RAID group Gr2 into four 256-kB data blocks is continuously acquired. In the sixth to eighth sessions, data is acquired in the same manner as the method for acquiring the data in the fifth session.

Data is acquired from the RAID groups Gr3 and Gr4 in the same manner as the method for acquiring the data from the RAID groups Gr1 and Gr2.

As a result of the data acquisition, the 1 MB data is stored in the cache memory unit 120 in each of the 16 sessions (or the data with the total amount of 16 MB is stored in the cache memory unit 120).

The aforementioned process can improve the efficiency of transferring data to the storage device 40 from the copy controller 110 and increase the possibility that the rate at which the data is read from the cache memory unit 120 by the disk controller 130 can be supported. Thus, it is possible to reduce the need for the disk controller 130 to read the data from the drive enclosure 12 again. The reason is as follows. If the operation of transferring data to the storage device 40 by the copy controller 110 does not support the rate at which the data is read from the cache memory unit 120 by the disk controller 130, the data stored in the cache memory unit 120 may be updated by the prefetch operation of the disk controller 130, and data to be read by the copy controller 110 may not exist in the cache memory unit 120. If the data to be read by the copy controller 110 does not exist in the cache memory unit 120, the disk controller 130 searches the data (that was not able to be read) in the drive enclosure 12 again. The time period for which the disk controller 130 searches the data and reads the data into the cache memory unit 120 again would be lost time. In the present embodiment, however, the disk controller 130 reads, into the cache memory unit 120, the data (to be prefetched) that has the aforementioned total amount expressed by Equation (1), and the copy controller 110 transfers the data to the storage device 40 in parallel. Thus, the possibility that the data to be read by the copy controller 110 does not exist in the cache memory unit 120 can be reduced. Therefore, it is possible to reduce the need for the disk controller 130 to read the data from the drive enclosure 12 again.

Next, an operation (hereinafter referred to as a second copy operation) of the controller module 11 to copy data stored in the drive enclosure 12 to the storage device 50 is described.

The second copy operation may be performed to copy data to a hard disk drive provided with a disk that rotates at a rotational rate (per unit time) that is lower than the rotational rate of the disks of the hard disk drives included in the drive enclosure 12.

Figure 6:
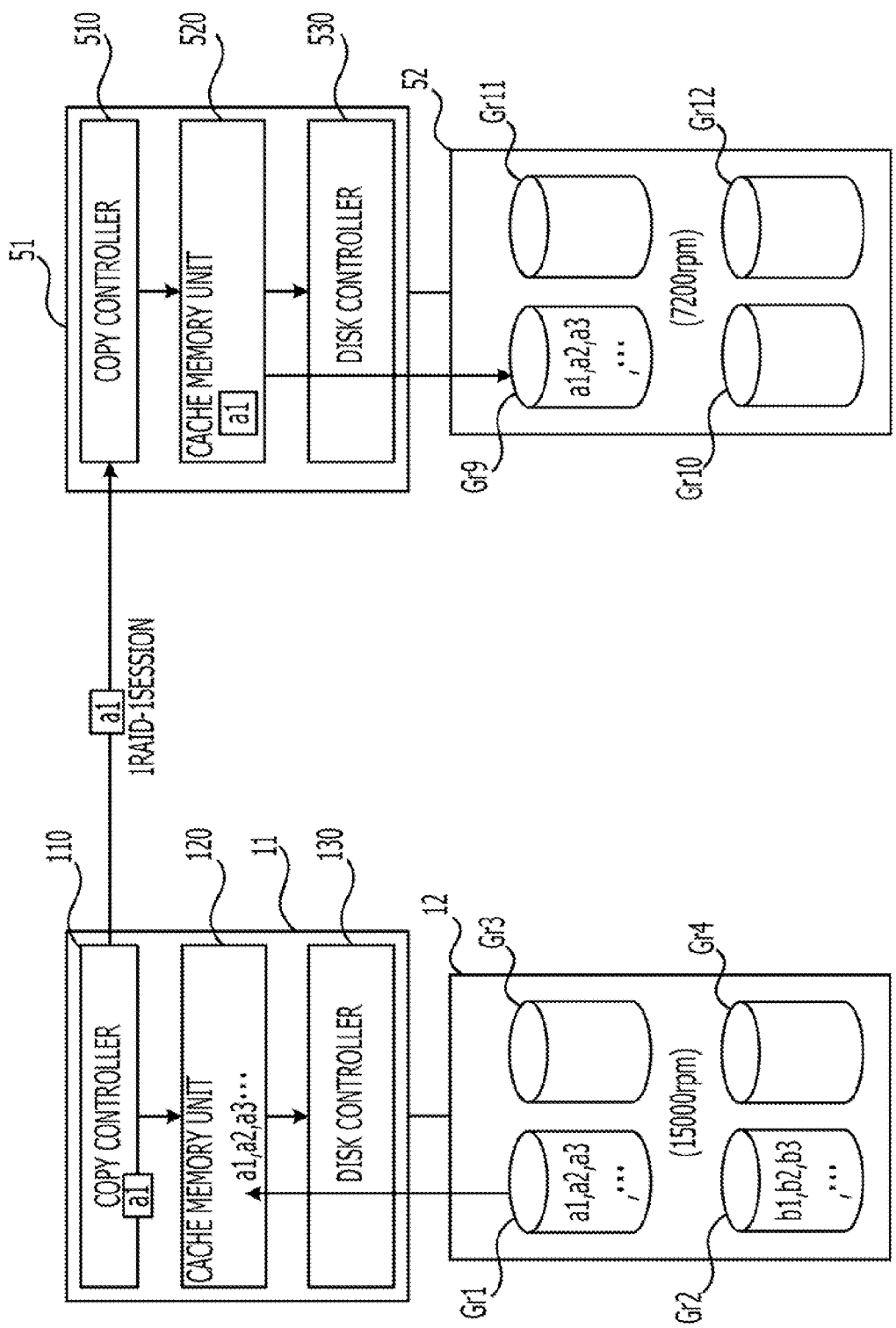
FIG. 6 is a diagram illustrating a second copy operation of the controller module.

FIG. 6 is a diagram illustrating the second copy operation of the controller module 11.

The storage device 50 includes a controller module 51 and a drive enclosure 52. The controller module 51 has the same functions as the controller module 11. The drive enclosure 52 has the same RAID configuration as the drive enclosure 12.

In the second copy operation, the disk controller 130 repeatedly performs an operation of reading data (to be prefetched) with the pre-specified amount (1 MB in the present embodiment) from the drive enclosure 12 and storing the read data into the cache memory unit 120.

As illustrated in FIG. 6, data a1, a2, a3 and a4 that is obtained by dividing data stored in continuous regions of the RAID group Gr1 into four 256-kB data blocks is prefetched and stored in the cache memory unit 120.

The copy controller 110 acquires the data a1 stored in the cache memory unit 120. Then, the copy controller 110 transmits the acquired data a1 to the storage device 50 to which the data a1 is to be copied.

In the storage device 50 that receives the data a1, a copy controller 510 causes the received data a1 to be stored in a cache memory unit 520.

A disk controller 530 reads the data a1 stored in the cache memory unit 520 and writes the read data a1 in a RAID group Gr9.

A process that is the same as the process performed on the data a1 is performed on data a2, a3 and a4. During the time when the disk controller 530 writes the data a1 to a4 in the RAID group Gr9, the disk controller 130 prefetches data b1, b2, b3 and b4 obtained by dividing data stored in continuous regions of the RAID group Gr3 into four 256-kB data blocks and causes the prefetched data b1, b2, b3 and b4 to be stored in the cache memory unit 120. When the writing of the data a4 is completed, the copy controller 110 starts to transmit the data b1 stored in the cache memory unit 120 to the storage device 50.

In the storage device 50 that receives the data b1, the copy controller 510 causes the received data b1 to be stored in the cache memory unit 520.

The disk controller 530 reads the data b1 stored in the cache memory unit 520 and writes the read data b1 in a RAID group Gr10. After that, a process that is the same as the process performed on the data b1 is performed on the data b2, b3 and b4.

Then, data c1, c2, c3 and c4 is written in a RAID group Gr11 in the same manner as the method for writing the data a1 to a4 and the data b1 to b4. In addition, data d1, d2, d3 and d4 is written in a RAID group Gr12 in the same manner as the method for writing the data a1 to a4 and the data b1 to b4.

After that, during the time when the disk controller 530 writes the data d1 to d4 in the RAID group Gr12, the disk controller 130 prefetches data a5, a6, a7 and a8 obtained by dividing data, which is adjacent to the data a4 stored in the RAID group Gr1 and is stored in continuous regions of the RAID group Gr1, into four 256-kB data blocks, and the disk controller 130 causes the prefetched data a5, a6, a7 and a8 to be stored in the cache memory unit 120. After that, the aforementioned copy operation is repeated until all data is copied.

In the second copy operation, the amounts of movements of arms that are included in the hard disk drives 12a, 12b, 12c and 12d and have magnetic heads can be reduced by reading the data stored in the RAID groups Gr1 to Gr4 on a session basis, compared to the case in which the data stored in the RAID groups Gr1 to Gr4 is sequentially read. Thus, in the second copy operation, the rate of copying data may be increased.

Next, operations of the storage system 100 are described using a flowchart.

Figure 7:
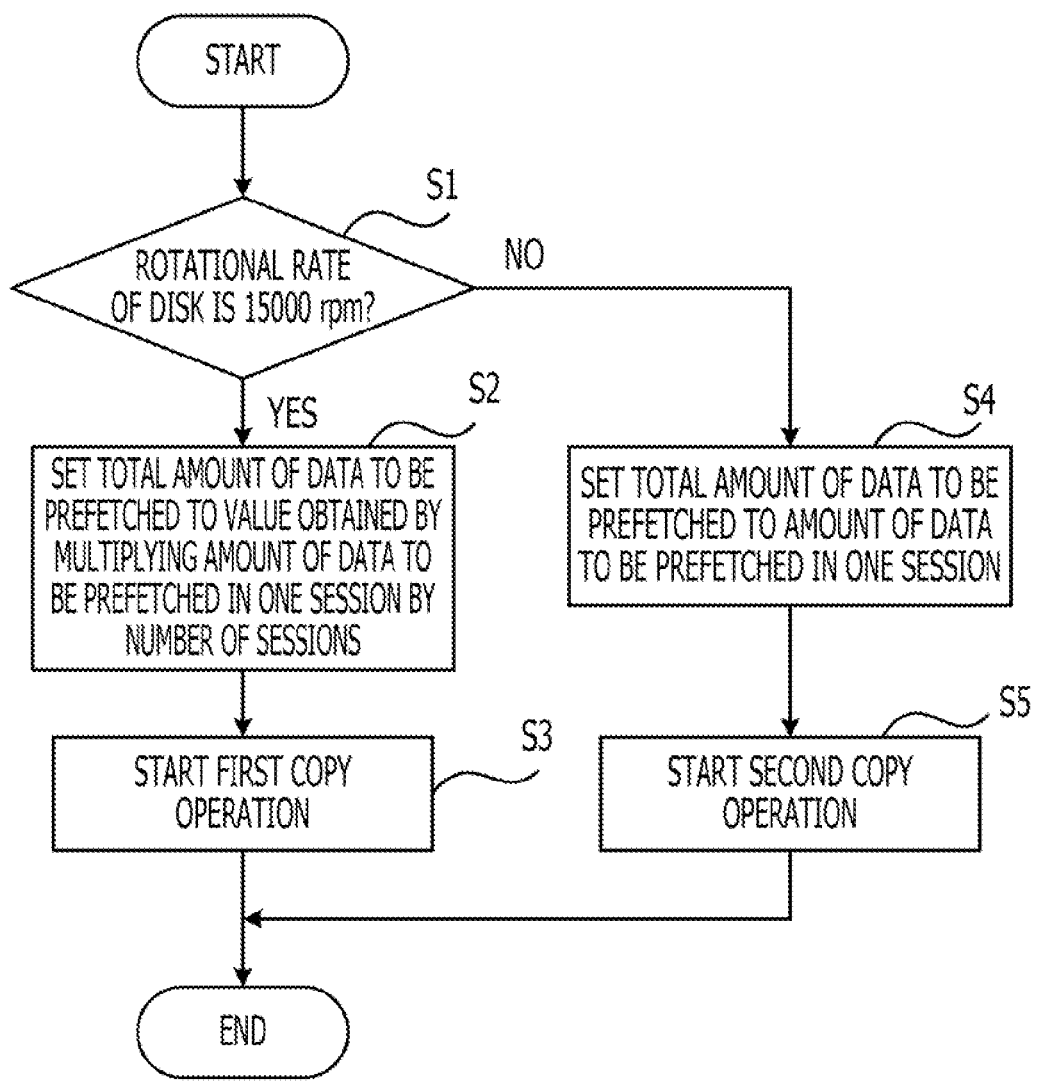
FIG. 7 is a flowchart of operations of the storage system.

FIG. 7 is a flowchart of the operations of the storage system.

The disk controller 130 determines whether or not a rotational rate (per unit time) of a disk included in a drive enclosure to which data is to be copied is 15000 rpm (in operation S1). When the rotational rate of the disk included in the drive enclosure to which the data is to be copied is 15000 rpm (Yes in operation S1), a process illustrated in FIG. 7 proceeds to operation S2. When the rotational rate of the disk included in the drive enclosure to which the data is to be copied is not 15000 rpm or is 7200 rpm (No in operation S1), the process proceeds to operation S4.

The disk controller 130 determines the total amount of data to be prefetched in accordance with the aforementioned Equation (1) (in operation S2). After that, the process proceeds to operation S3.

The disk controller 130 performs the first copy operation (in operation S3). When the first copy operation is terminated, the process illustrated in FIG. 7 is terminated.

The disk controller 130 sets the total amount of the data to be prefetched to the amount of data to be prefetched in one session (in operation S4). After that, the process proceeds to operation S5.

The disk controller 130 performs the second copy operation (in operation S5). When the second copy operation is terminated, the process illustrated in FIG. 7 is terminated.

As described above, in the storage system 100 according to the present embodiment, it is possible to reduce the need for the disk controller 130 to read the data from the drive enclosure 12 again. Thus, the process of copying data may be performed at a higher copy rate.

Next, a comparative example is described.

Figure 8:
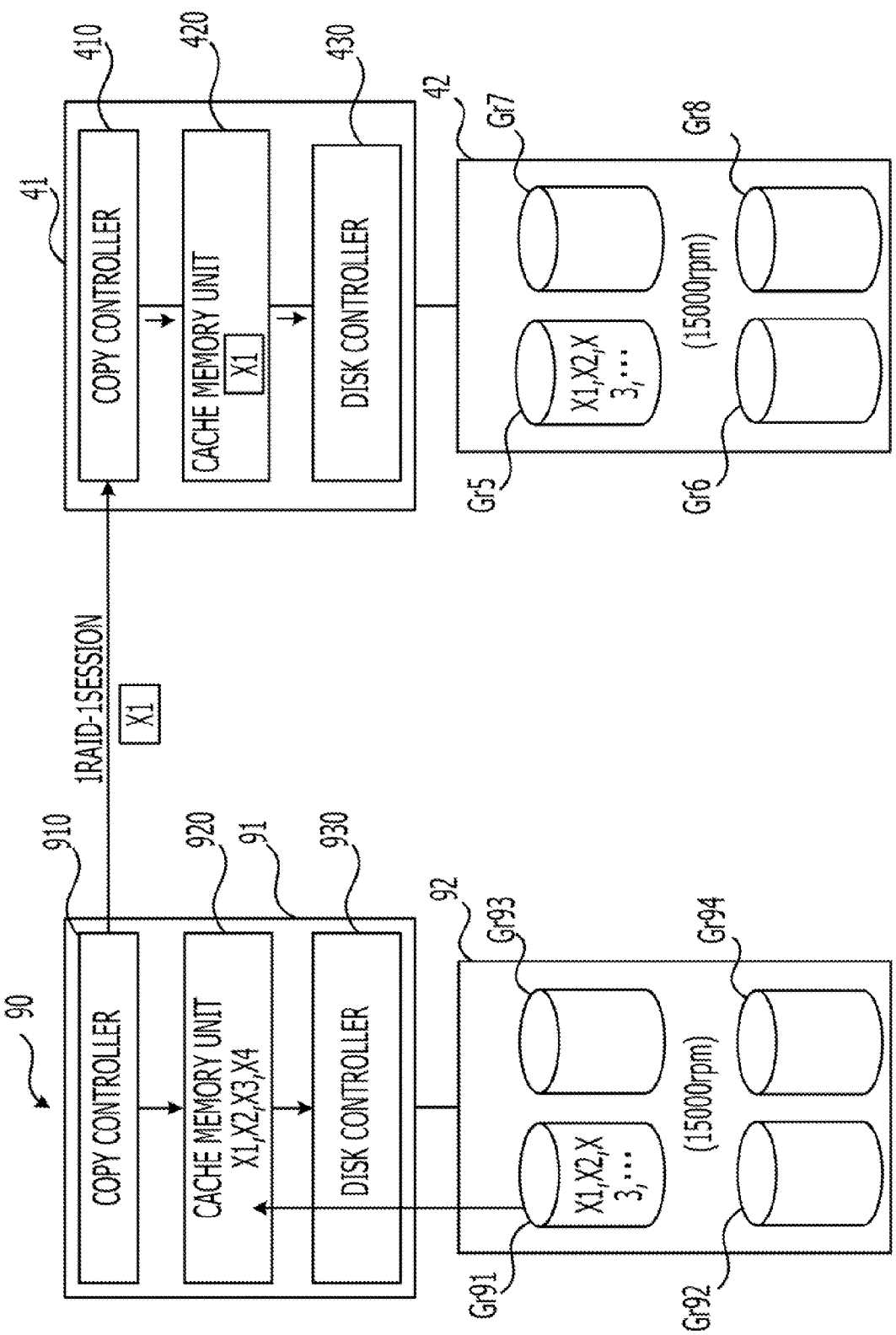
FIG. 8 is a diagram illustrating a copy operation according to a comparative example.

FIG. 8 is a diagram illustrating a copy operation according to the comparative example.

The comparative example illustrated in FIG. 8 describes that a storage device 90 that is different from the storage device 10 performs an operation of copying data to the storage device 40.

A controller module 91 that is included in the storage device 90 according to the comparative example includes a copy controller 910, a cache memory unit 920 and a disk controller 930. A function of the copy controller 910, a function of the cache memory unit 920 and a function of the disk controller 930 are the same as the copy controller 110, the cache memory unit 920 and the disk controller 130, respectively. A control method that is used by the controller module 91 is different from the control method that is used by the controller module 11. In the comparative example, data is copied by the second copy operation from a disk that rotates at a rotational rate (per unit time) of 15000 rpm and is included in a drive enclosure 92 to a disk that rotates at a rotational rate (per unit time) of 15000 rpm and is included in the drive enclosure 42.

The disk controller 930 copies data to the storage device 40 from RAID groups in each of the sessions on a RAID group basis and on a session basis. Specifically, the disk controller 930 first prefetches data X1, X2, X3 and X4 from a RAID group Gr91. When the data X1 is transmitted to the cache memory unit 920, the copy controller 910 acquires the data X1 from the cache memory unit 920 and transmits the data X1 to the storage device 40.

In the storage device 40, the copy controller 410 causes the received data X1 to be stored in the cache memory unit 420. Then, the disk controller 430 writes the data X1 stored in the cache memory unit 420 in the RAID group Gr5.

The disk controller 930 acquires the data X1 independently from the operation of the copy controller 910. After the disk controller 930 causes the data X1 to be stored in the cache memory unit 920, the disk controller 930 causes the data X2, X3 and X4 to be stored in the cache memory unit 920.

Figure 9:
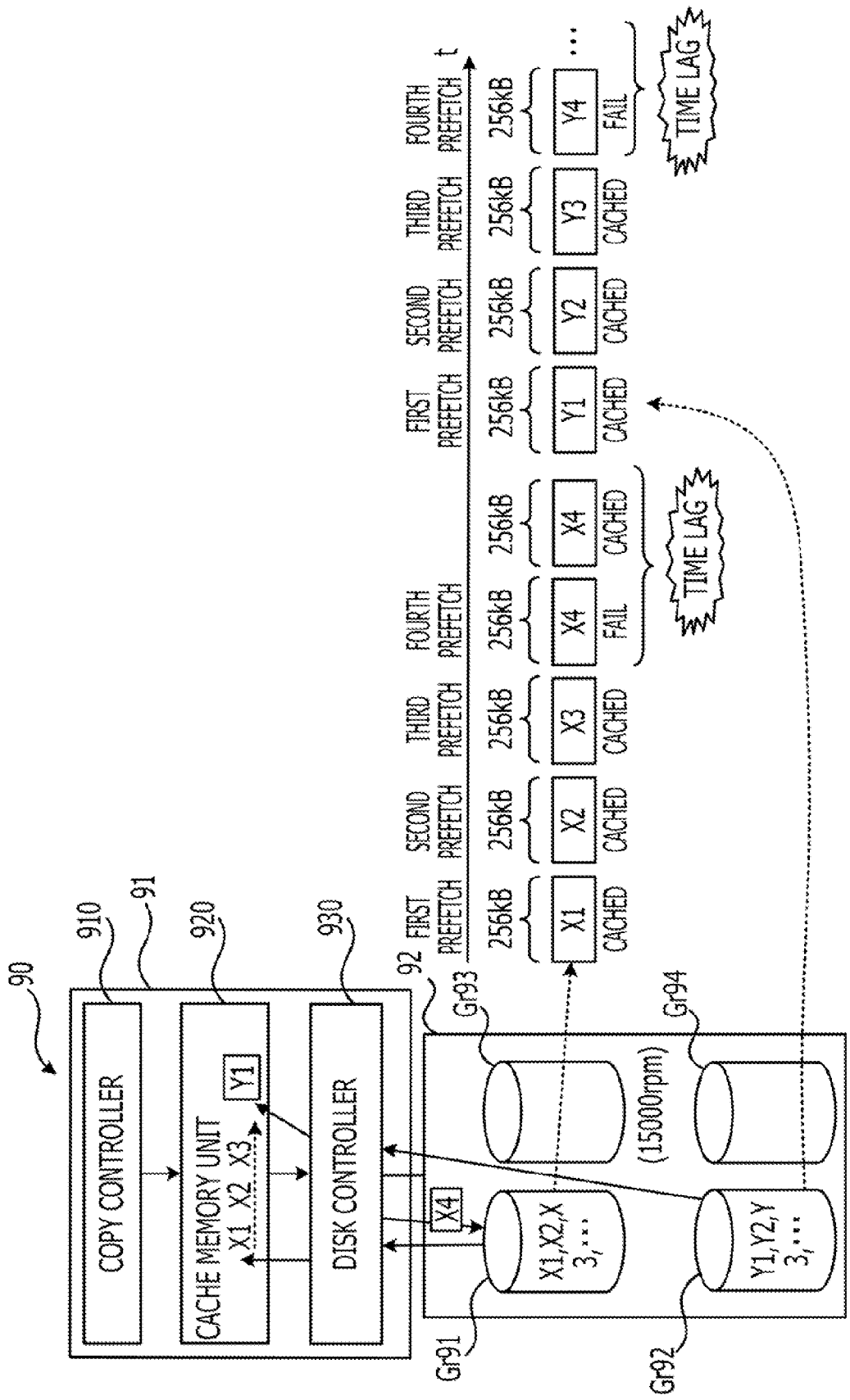
FIG. 9 is a diagram illustrating the copy operation according to the comparative example.

FIG. 9 is a diagram illustrating the copy operation according to the comparative example.

In the storage device 90 according to the comparative example, when the copy controller 910 copies the data X1, X2 and X3, a process of prefetching data is performed in another session. Thus, despite the fact that the copy controller 910 has yet to copy the data in a previous copy process, data that is acquired in the next prefetch process is rewritten in the cache memory unit 920. As a result, the data X4 fails to be cached. The disk controller 930 accesses the RAID group Gr91 again in order to prefetch the data X4. Thus, a seek time of approximately 6 milliseconds is added for each of copy operations that are performed in the sessions, respectively.

On the other hand, in the first copy operation that is performed by the storage device 10, a waiting time for the hard disk drives 12a to 12d to seek data does not occur. Thus, the operation of copying data to the storage device 40 can be performed by the storage device 10 at a higher copy rate, compared to the storage device 90.

The data copying device disclosed herein, the method (disclosed herein) for copying data and the storage device disclosed herein are described above on the basis of the embodiments illustrated in the drawings. The embodiments are not limited to the foregoing description. Each of the configurations may be replaced with any configuration provided with the same function. In addition, another configuration may be added to the configurations described in the embodiments, and another operation may be added to the operations described in the embodiments.

Two or more of the configurations (features) described in the embodiments may be combined.

The aforementioned processing functions can be achieved by a computer. In this case, a program in which details of the processing functions of the data copying device 1 or details of the processing functions of the controller module 11 are described is provided. The program in which the details of the processing functions are described can be stored in a computer-readable storage medium. Examples of the computer-readable storage medium are a magnetic storage device, an optical disc, a magneto-optical storage device, and a semiconductor memory. Examples of the magnetic storage device are a hard disk drive (HDD), a flexible disk (FD) and a magnetic tape. Examples of the optical disc are a DVD, a DVD-RAM, and a CD-ROM/RW. An example of the magneto-optical storage device is a magneto-optical (MO) disk.

In order to distribute the program, a portable storage medium (such as a DVD or a CD-ROM) that stores the program is marketed. In addition, the program can be stored in a storage device of a server computer and transferred from the server computer to another computer through a network.

The computer that executes the program stores, in a storage device of the computer, the program stored in the portable storage medium or the program transferred from the server computer. The computer reads the program stored in the storage device of the computer and performs a process in accordance with the program. The computer can directly read the program from the portable storage medium and performs the process in accordance with the program. In addition, every time the program is transferred to the computer from the server computer connected to the network, the computer can sequentially performs a process in accordance with the received program.

At least a part of the aforementioned processing functions can be achieved by an electronic circuit such as a digital signal processor (DSP), an application specific integrated circuit (ASIC) or a programmable logic device (PLD).

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data copying device that copies data stored in a first data storage device to a second data storage device, the data copying device comprising:
   a memory; and
   a processor coupled to the memory and configured to:
      determine whether a rotational rate of a disk included in the second data storage device is equal to a rotational rate of a disk included in the first data storage device,
      read data that has an amount determined based on a number of a plurality of logical volumes included in the first data storage device storing the data to be copied and an amount of data to be transferred from each of the logical volumes,
      store the data read from the first data storage device in the memory, and
      transfer the data stored in the memory to the second storage device,
   wherein the reading reads the data that has the determined amount from the plurality of logical volumes at one time when the determining determines that the rotational rates are equal to each other.

2. A data copying device that copies data stored in a first data storage device to a second data storage device, the data copying device comprising:
   a memory; and
   a processor coupled to the memory and configured to:
      read data that has an amount determined based on a number of a plurality of logical volumes included in the first data storage device storing the data to be copied and an amount of data to be transferred from each of the logical volumes,
      store the data read from the first data storage device in the memory, and
      transfer the data stored in the memory to the second storage device,
      wherein the reading reads the data that has the determined amount from one of the plurality of logical volumes at one time in response to determining that a rotational rate of a disk included in the second data storage device is lower than a rotational rate of a disk included in the first data storage device.

3. A method of copying data that is to be copied and is stored in a first data storage device to a second data storage device, the method comprising:
   determining whether a rotational rate of a disk included in the second data storage device is equal to a rotational rate of a disk included in the first data storage device;
   reading data that has an amount determined on the basis of a number of a plurality of logical volumes included in the first data storage device storing the data to be copied and an amount of data to be transferred from each of the logical volumes before transfer of the data;

storing the data that has the determined amount and has been read from the first data storage device; and transferring the data read from the logical volumes and stored to the second storage device in which the data to be copied is stored, wherein the reading reads the data that has the determined amount from the plurality of logical volumes at one time when the determining determines that the rotational rates are equal to each other.

4. A data storage device comprising:

a first data storage device that stores data to be copied;

a memory; and a processor coupled to the memory and configured to:

determine whether a rotational rate of a disk included in a second data storage device is equal to a rotational rate of a disk included in the first data storage device, read data that has an amount determined on the basis of a number of a plurality of logical volumes included in the first data storage device storing the data to be copied and an amount of data to be transferred from each of the logical volumes before transfer of the data, store the data that has the determined amount and has been read from the first data storage device in the memory, and transfer the data read from the logical volumes and stored in the memory to the second storage device in which the data to be copied is stored, wherein the reading reads the data that has the determined amount from the plurality of logical volumes at one time when the determining determines that the rotational rates are equal to each other.

5. A method of copying data that is to be copied and is stored in a first data storage device to a second data storage device, the method comprising:

reading data that has an amount determined based on a number of a plurality of logical volumes included in the first data storage device storing the data to be copied and an amount of data to be transferred from each of the logical volumes, storing the data read from the first data storage device in a memory, and transferring the data stored in the memory to the second storage device, wherein the reading reads the data that has the determined amount from one of the plurality of logical volumes at one time in response to determining that a rotational rate of a disk included in the second data storage device is lower than a rotational rate of a disk included in the first data storage device.

6. A data storage device comprising:

a first data storage device that stores data to be copied;

a memory; and a processor coupled to the memory and configured to:

read data that has an amount determined on the basis of a number of a plurality of logical volumes included in the first data storage device storing the data to be copied and an amount of data to be transferred from each of the logical volumes before transfer of the data, store the data that has the determined amount and has been read from the first data storage device in the memory, and transfer the data read from the logical volumes and stored in the memory to a second storage device in which the data to be copied is to be stored, wherein the reading reads the data that has the determined amount from one of the plurality of logical volumes at one time in response to determining that a rotational rate of a disk included in the second data storage device is lower than a rotational rate of a disk included in the first data storage device.

* * * * *